(12) United States Patent
Israeli et al.

(10) Patent No.: US 12,267,317 B2
(45) Date of Patent: Apr. 1, 2025

(54) ENFORCEMENT OF ENTERPRISE BROWSER USE

(71) Applicant: ISLAND TECHNOLOGY INC., Dallas, TX (US)

(72) Inventors: Raviv Israeli, San Francisco, CA (US); Sergey Lanzman, Be'er Ya'akov (IL); Dan Amiga, Ramat Hasharon (IL); Jonathan Roth, Tel Aviv (IL); Amit Dror, Kfar Saba (IL); Ofer Yorkovsky, Givatayim (IL)

(73) Assignee: ISLAND TECHNOLOGY, INC., Dallas, TX (US)

( * ) Notice: Subject to any disclaimer, the term of this patent is extended or adjusted under 35 U.S.C. 154(b) by 210 days.

(21) Appl. No.: 17/993,919

(22) Filed: Nov. 24, 2022

(65) Prior Publication Data

US 2023/0164140 A1    May 25, 2023

Related U.S. Application Data

(60) Provisional application No. 63/282,701, filed on Nov. 24, 2021.

(51) Int. Cl.
 *H04L 9/40* (2022.01)
(52) U.S. Cl.
 CPC ................. *H04L 63/083* (2013.01)
(58) Field of Classification Search
 CPC ........................ H04L 63/083; H04L 63/0807
 See application file for complete search history.

(56) References Cited

U.S. PATENT DOCUMENTS

| | | | |
|---|---|---|---|
| 9,781,122 B1* | 10/2017 | Wilson | H04L 63/08 |
| 10,044,723 B1* | 8/2018 | Fischer | H04L 63/102 |
| 10,404,702 B1* | 9/2019 | Chakraborty | H04L 63/101 |
| 10,944,738 B2* | 3/2021 | Rykowski | H04L 63/0815 |
| 11,870,781 B1* | 1/2024 | Medina | G06F 9/541 |

(Continued)

FOREIGN PATENT DOCUMENTS

| | | |
|---|---|---|
| WO | 2015171517 A1 | 11/2015 |
| WO | 2016007154 A1 | 1/2016 |
| WO | 2017079523 A1 | 5/2017 |

OTHER PUBLICATIONS

NPL Search History (Year: 2024).*

*Primary Examiner* — Samson B Lemma
*Assistant Examiner* — Richard W Cruz-Franqui
(74) *Attorney, Agent, or Firm* — AlphaPatent Associates Ltd.; Daniel J. Swirsky

(57) ABSTRACT

Web browser control by configuring a web browser to send to a second computer server, in response to a request by a user of the web browser to access a resource at a first computer server, an authentication token and the request to access the resource, where the second computer server is configured to determine whether the authentication token is valid, and if the authentication token is valid, whether the request to access the resource is authorized, and send to the first computer server, if the request to access the resource is authorized, the request to access the resource, and where the request sent by the second computer server is sent via an intermediary configured to block attempts to access the first computer server that are received from a sender network address that is not a predefined valid network address of the second computer server.

6 Claims, 8 Drawing Sheets

(56) References Cited

U.S. PATENT DOCUMENTS

| | | | | |
|---|---|---|---|---|
| 2002/0194140 | A1* | 12/2002 | Makuck | G06Q 20/1235 705/67 |
| 2006/0259759 | A1* | 11/2006 | Maino | H04L 63/162 713/151 |
| 2009/0055891 | A1* | 2/2009 | Okamoto | H04L 63/101 726/1 |
| 2009/0222584 | A1* | 9/2009 | Josefsberg | H04L 61/4511 709/245 |
| 2009/0222907 | A1* | 9/2009 | Guichard | H04L 63/1408 726/17 |
| 2010/0154046 | A1 | 6/2010 | Liu et al. | |
| 2010/0325441 | A1* | 12/2010 | Laurie | H04L 9/3257 713/185 |
| 2011/0004753 | A1* | 1/2011 | Gomi | H04L 63/0807 713/175 |
| 2011/0099120 | A1* | 4/2011 | Grossman | G16H 10/60 705/325 |
| 2011/0213797 | A1* | 9/2011 | Hess | G06F 21/6218 707/769 |
| 2013/0061054 | A1* | 3/2013 | Niccolai | H04L 9/083 713/171 |
| 2014/0136837 | A1* | 5/2014 | Baylina | H04W 12/069 726/4 |
| 2015/0012616 | A1* | 1/2015 | Pearl | H04L 67/1095 709/219 |
| 2015/0256514 | A1* | 9/2015 | Laivand | H04L 63/20 726/3 |
| 2015/0271678 | A1* | 9/2015 | Yaosaka | H04W 12/08 726/4 |
| 2017/0126661 | A1* | 5/2017 | Brannon | H04L 63/0815 |
| 2017/0187673 | A1* | 6/2017 | Kaliski, Jr. | H04L 61/302 |
| 2017/0295156 | A1* | 10/2017 | Spencer | H04L 63/08 |
| 2017/0366547 | A1* | 12/2017 | Goldfarb | H04L 63/10 |
| 2019/0394041 | A1* | 12/2019 | Jain | H04L 9/3247 |
| 2020/0159676 | A1* | 5/2020 | Durham | G06F 12/0811 |
| 2021/0006591 | A1* | 1/2021 | Akuka | H04L 63/1416 |
| 2022/0116381 | A1* | 4/2022 | Bosch | H04L 63/105 |
| 2023/0032814 | A1* | 2/2023 | Pandurangan | H04L 63/108 |
| 2023/0412382 | A1* | 12/2023 | Palanisamy | H04L 63/104 |

* cited by examiner

ENFORCEMENT OF ENTERPRISE BROWSER USE

BACKGROUND

Web browser are among the most widely used computer software applications. Organizations, including commercial business enterprises and government bodies, are increasingly dependent on the use of web browsers by those who work on their behalf. Organizations that wish to exercise control over web browsers, such as to audit their use and prevent them from downloading malware or transmitting sensitive information outside of the organization, are typically forced to implement various measures that are external to web browsers, such as on computers that host web browsers and on network infrastructure through which web browsers communicate. Unfortunately, such measures are often costly and complex to configure and manage, lack visibility to all aspects of internal web browser operation, can impede web browser users from accomplishing their work tasks efficiently, and are too often thwarted by successful attempts to bypass them.

SUMMARY

In one aspect of the invention a method of web browser control is provided, the method including configuring a web browser to send to a first computer server a request by a user of the web browser to access a resource at the first computer server, where the first computer server is configured to associate the computer user with a predefined identity provider network address, and redirect the web browser to access the identity provider network address, and configuring the web browser to send to a second computer server, in response to receiving the identity provider network address from the first computer server, an authentication token and a request to access the identity provider network address, where the second computer server is configured to determine whether the authentication token is valid, determine, if the authentication token is valid, whether the request to access the identity provider network address is authorized, and send to the identity provider, if the request to access the identity provider network address is authorized, the request to access the identity provider network address, and where the identity provider is configured to associate the identity provider network address for use with incoming requests from the second computer server, and block attempts to access the identity provider network address that are received from a sender network address that is not a predefined valid network address of the second computer server.

In another aspect of the invention the web browser is configured with the authentication token.

In another aspect of the invention the second computer server is configured to determine whether the request to access the identity provider network address is authorized by determining whether the user of the web browser is authorized to access the identity provider network address.

In another aspect of the invention the second computer server is configured to determine whether the request to access the identity provider network address is authorized by determining whether a tenant associated with the user of the web browser is authorized to access the identity provider network address.

In another aspect of the invention the identity provider is configured with the predefined valid network address of the second computer server.

In another aspect of the invention the second computer server relays communications between the web browser and the identity provider until the user is authenticated by the identity provider and redirected by the identity provider to access the resource to which the user originally requested access at the first computer server.

In another aspect of the invention a method of web browser control is provided, the method including configuring a web browser to send to a second computer server, in response to a request by a user of the web browser to access a resource at a first computer server, an authentication token and the request to access the resource at a first computer server, where the second computer server is configured to determine whether the authentication token is valid, determine, if the authentication token is valid, whether the request to access the resource at the first computer server is authorized, and send to the first computer server, if the request to access the resource at the first computer server is authorized, the request to access the resource at the first computer server, and where the request sent by the second computer server is sent via an intermediary configured to block attempts to access the first computer server that are received from a sender network address that is not a predefined valid network address of the second computer server.

In another aspect of the invention the intermediary is any of a firewall, a load balancer, and a reverse proxy.

In another aspect of the invention the second computer server relays between the web browser and the first computer server communications that are not blocked by the intermediary.

In another aspect of the invention a method of web browser control is provided the method including configuring a web browser to send to a first computer server a request by a user of the web browser to access a resource at the first computer server, where the first computer server is configured to associate the computer user with a predefined identity provider network address at an identity provider, provide a Security Assertion Markup Language (SAML) request to the web browser, and redirect the web browser to send the Security Assertion Markup Language (SAML) request to the identity provider network address, where the identity provider is configured to authenticate the user, provide a SAML response to the web browser, and redirect the web browser to send the SAML response to a second computer server, and configuring the web browser to send to the second computer server, in response to receiving the SAML response from the identity provider, an authentication token and the SAML response, where the second computer server is configured to determine whether the authentication token is valid, determine, if the authentication token is valid, whether the request to access the resource at the first computer server is authorized, and send to the first computer server, if the request to access the resource at the first computer server is authorized, the SAML response together with the request to access the resource at the first computer server, and where the first computer server is configured to determine whether the SAML response is valid and, if the SAML response is valid, allow the user to access the resource.

In another aspect of the invention a method of web browser control is provided, the method including configuring a web browser to send a predefined identifier in a communication sent by the web browser, where a destination of the communication is indicated within the communication, and configuring an intermediary to receive the communication, determine whether the identifier is present within the received communication, allow the received communication to proceed to the destination of the communication if the identifier is present within the received communication, and prevent the received communication from proceeding to the destination of the communication if the identifier is not present within the received communication.

In another aspect of the invention the identifier is a digital token, header, or certificate.

In another aspect of the invention the web browser is configured to include the identifier in all communications sent by the web browser.

In another aspect of the invention the web browser is configured to include the identifier in communications sent by the web browser to one or more predefined destinations.

In another aspect of the invention the intermediary is configured to determine whether the identifier is present within the communication received from a predefined origin.

In another aspect of the invention the predefined origin includes one or more predefined network addresses.

In another aspect of the invention the predefined origin includes the network address of a computing device that hosts the web browser.

In another aspect of the invention a method of web browser control is provided, the method including installing a web browser on a computer that is configured to route to an intermediary all communications sent by the computer, where the first intermediary is configured to prevent some or all of the communications from proceeding to destinations that are indicated within the communications, and configuring the web browser to override the configuration of the computer and allow all of the communications sent by the web browser to proceed to destinations that are indicated within the communications sent by the web browser, where the computer and the intermediary are protected in accordance with an access-control technique making them configurable only by authorized personnel.

In another aspect of the invention the intermediary is a proxy server.

In another aspect of the invention the configuring includes configuring the web browser to override the configuration of the computer and route to a second intermediary all communications sent by the web browser, where the second intermediary is configured to allow all of the communications sent by the web browser to proceed to destinations that are indicated within the communications sent by the web browser.

In another aspect of the invention the configuring includes configuring the web browser with empty proxy settings for all communications send by the web browser, thereby enabling all of the communications sent by web browser to proceed to destinations that are indicated within the communications sent by the web browser without being routed through the intermediary.

In another aspect of the invention a method of web browser control is provided, the method including installing a web browser on a computer that is configured to use a first Domain Name System (DNS) server to resolve domains of all URLs to which access is requested by software or hardware installed on the computer, where the first DNS server is configured to not correctly resolve all domain resolution requests that the first DNS server receives, and configuring the web browser to override the configuration of the computer and use a second DNS server to resolve domains of all URLs to which access is requested by the web browser, where the second DNS server is configured to correctly resolve all domain resolution requests that the second DNS server receives, where the computer and the first and second DNS servers are protected in accordance with an access-control technique making them configurable only by authorized personnel.

In another aspect of the invention the first DNS server is configured to resolve any of the domain resolution requests that the first DNS server receives to a predefined blocking web page at a domain that is not associated with the domains of the requested URLs.

In another aspect of the invention the second DNS server is configured as a secure DNS server that requires that access to the second DNS server be authenticated with an authentication token, and where the web browser is configured with the authentication token.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
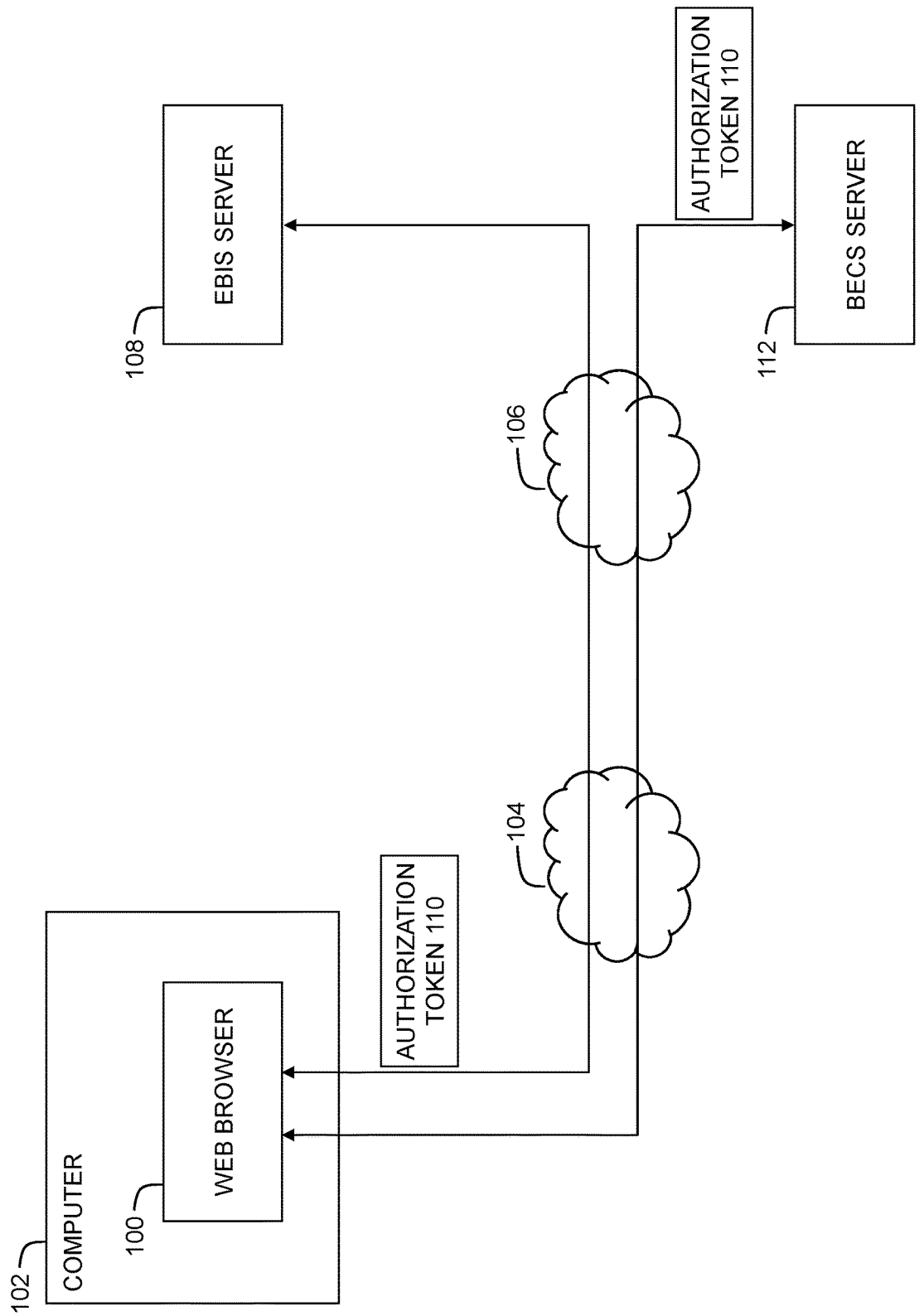
FIG. 1 is a simplified conceptual illustration of a system for enforcing enterprise browser use, constructed and operative in accordance with an embodiment of the invention.

Reference is now made to FIG. 1, which is a simplified conceptual illustration of a system for enforcing enterprise browser use, constructed and operative in accordance with an embodiment of the invention. In FIG. 1 a web browser 100 is configured to incorporate the functionality of conventional web browsers, such as those based on the Google™ Chromium™ architecture, and is additionally configured to operate as is described hereinbelow.

Web browser 100 may be hosted by any computing device, such as by a computer 102 that is connected to a computer network 104, which may, for example, be a corporate intranet that provides access to one or more other networks 106, such as the Internet. Copies of web browser 100 may, for example, be installed on multiple computing devices for use by individuals associated with an organization, such as by employees or contractors of a company, on company-owned computing devices or on non-company-owned computing devices, and configured to operate as described herein by system administrators and/or other parties authorized by the organization.

Web browser 100 is preferably configured to require that each user of web browser 100 be authenticated by a server 108, also referred to herein as Enterprise Browser Identity Server (EBIS) 108, before web browser 100 is allowed to perform one or more predefined operations, such as each time web browser 100 is executed and/or periodically thereafter, such as at predefined time intervals and/or before web browser 100 performs one or more operations predefined as requiring user reauthentication. An exemplary method of EBIS 108 authenticating web browser 100 is described hereinbelow with reference to FIG. 2. When web browser 100 is authenticated, EBIS 108 provides an encrypted authentication token 110 to web browser 100. Thereafter, web browser 100 provides authentication token 110 as proof of authentication to a server 112, also referred to herein as Browser Enforcement Cloud Server (BECS) 112, as is described hereinbelow with reference to FIGS. 2-6.

EBIS Authentication

Figure 2:
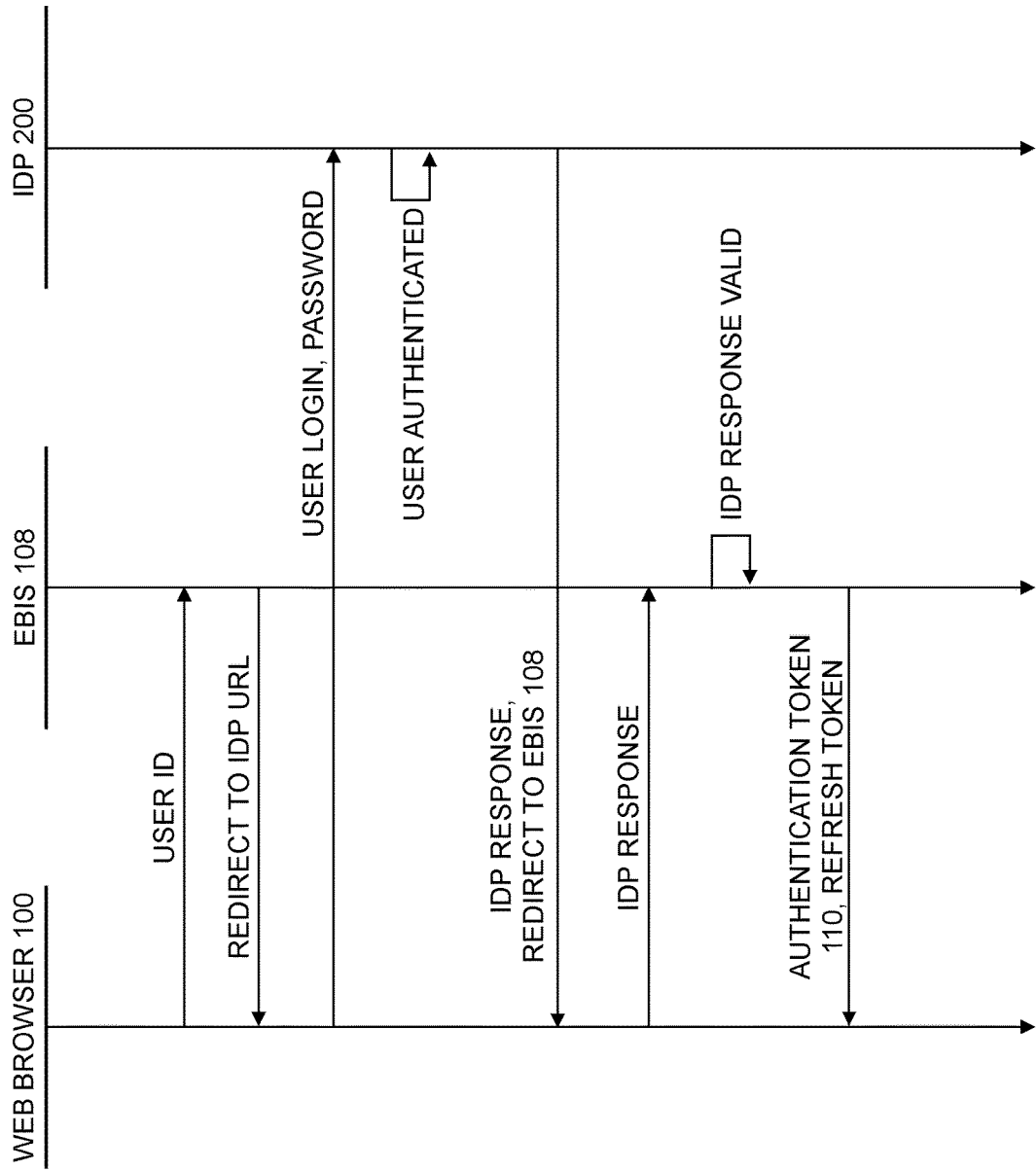
FIG. 2 is a simplified action diagram of an exemplary method of web browser authentication for use with the system of FIG. 1, operative in accordance with an embodiment of the invention.

Reference is now made to FIG. 2, which is a simplified action diagram of an exemplary method of web browser authentication for use with the system of FIG. 1, operative in accordance with an embodiment of the invention. In FIG. 2, a user of web browser 100 enters their user ID, such as an email address, into a login screen provided by web browser 100. Web browser 100 sends the user ID to EBIS 108, which applies predefined criteria to map the user ID to an identity provider server 200, also referred to herein as IdP 200, that has been configured with an application object that is associated with EBIS 108. EBIS 108 redirects web browser 100 to IdP 200, preferably at a Uniform Resource Locator (URL) that IdP 200 has uniquely associated with EBIS 108. The user enters their username and password into a login screen provided by IdP 200. IdP 200 provides a response to web browser 100, preferably where the response has been signed and/or encrypted in accordance with conventional techniques and in a manner that is decipherable by web browser 100, and redirects web browser 100 back to EBIS 108. The response includes a "code challenge" object in accordance with conventional IdP techniques. Web browser 100 provides the IdP response to EBIS 108 which decrypts and verifies the IdP response. EBIS 108 uses the "code_challenge" object to generate authentication token 110 and a refresh token, where authentication token 110 preferably includes the user's user ID and a tenant ID of a tenant associated with the user, such as the user's employer. EBIS 108 sends authentication token 110 and the refresh token to web browser 100, preferably where authentication token 110 and the refresh token have been signed and/or encrypted in accordance with conventional techniques and in a manner that is decipherable by BECS 112, where BECS 112 is configured to authenticate authentication token 110 and the refresh token in accordance with conventional techniques. Thereafter, all communications sent by web browser 100 to BECS 112 include authentication token 110, such as in a cookie or header, whereupon BECS 112 either validates authentication token 110 or determines that authentication token 110 is invalid or expired.

IP-Based Control—IdP

Figure 3:
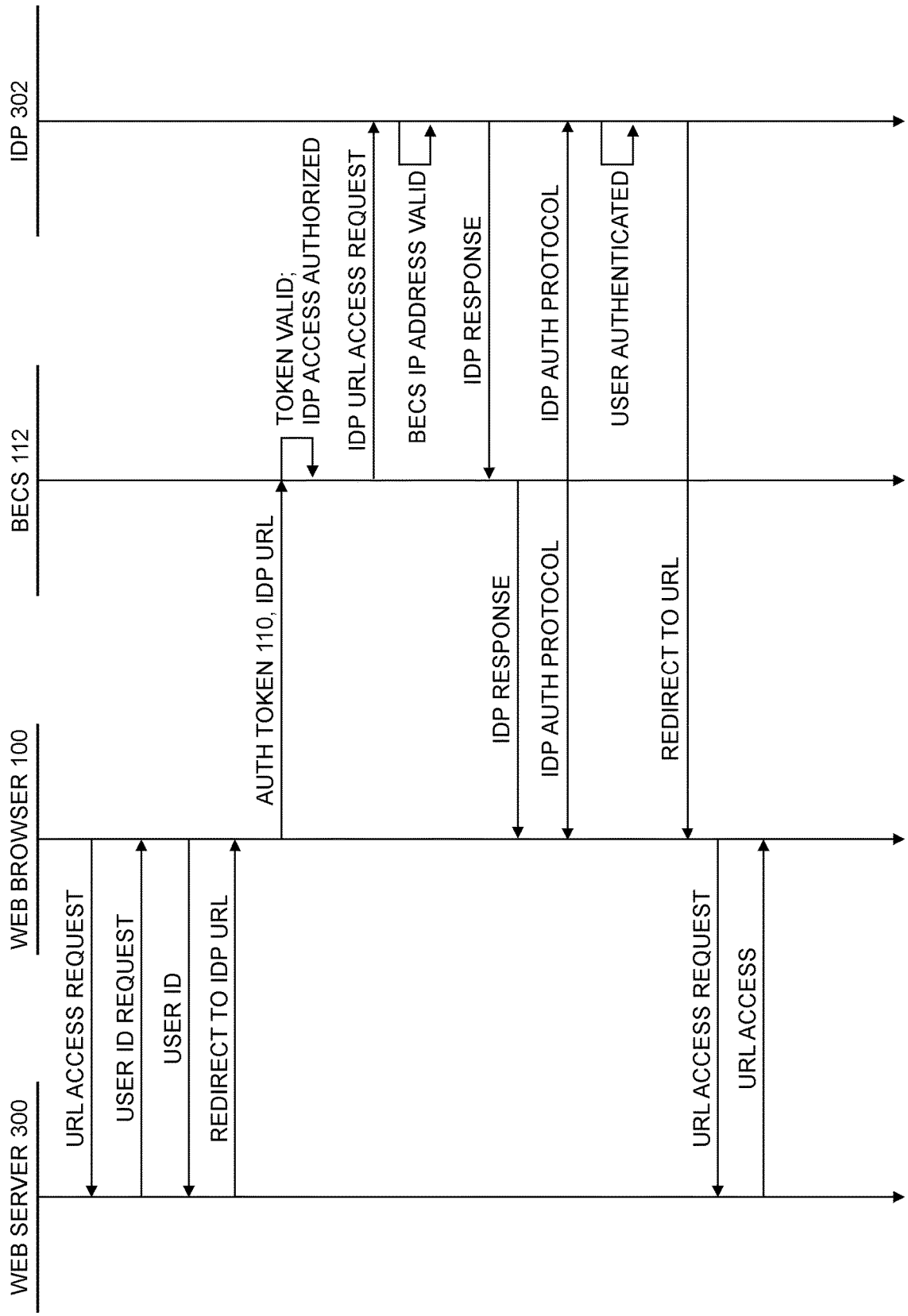
FIG. 3 is a simplified action diagram of an exemplary method of web browser control for use with the system of FIG. 1, operative in accordance with an embodiment of the invention.

Reference is now made to FIG. 3, which is a simplified action diagram of an exemplary method of web browser control for use with the system of FIG. 1, operative in accordance with an embodiment of the invention. In FIG. 3, a user of web browser 100 instructs web browser 100 to access a resource at a user-specified URL at a web server 300. Web browser 100 is configured, such as in accordance with a predefined policy, to allow web browser 100 to request the user-specified URL from web server 300. Web server 300 receives the request from web browser 100 and requests identification from the user, such as an email address or login and password, with which web server 300 is previously configured to associate with a predefined IdP URL at an IdP 302, such as a predefined IdP URL at that is uniquely associated with a specific IdP tenant. Web server 300 then redirects web browser 100 to the IdP URL at IdP 302 for authentication. Rather than directly access the IdP URL at IdP, web browser 100 sends to BECS 112 authentication token 110 together with the request by web browser 100 to access the IdP URL, such as in accordance with a predefined policy with which web browser 100 is configured. One non-limiting example of such a policy may require web browser 100 to send to BECS 112 all requests to access redirection URLs. Another non-limiting example of such a policy may require web browser 100 to send to BECS 112 a request to access a user-specified URL or a redirection URL if the URLs or their domains or subdomains appear on a predefined list with which web browser 100 is configured or that is otherwise accessible to web browser 100. BECS 112 validates authentication token 110 in accordance with conventional techniques. If authentication token 110 is valid, BECS 112 determines whether the request to access the IdP URL is authorized, such as by determining whether the current user of web browser 100 and/or a tenant associated with the user are authorized to access the IdP URL, such as in accordance with a predefined policy with which BECS 112 is configured. If access to the IdP URL is authorized, BECS 112 sends to IdP 302 the request by web browser 100 to access the IdP URL. IdP 302, having been previously configured to associate the IdP URL for use with incoming requests from BECS 112, and having been previously configured with one or more predefined valid IP addresses that are associated with BECS 112, is configured to block attempts to access the IdP URL that are received from IP addresses that are not among the predefined valid BECS IP addresses. If IdP 302 determines that the request to access the IdP URL was received from a valid BECS IP address, IdP 302 sends a response to BECS 112, which BECS 112 then sends to web browser 100. The process of IdP 302 authenticating the user of web browser 100 then continues in accordance with conventional techniques, but with BECS 112 proxying communications between web browser 100 and IdP 302 until the user is authenticated and redirected by IdP 302 to access the resource to which the user originally requested access at the user-specified URL.

IP-Based Control—Non-IdP

Figure 4:
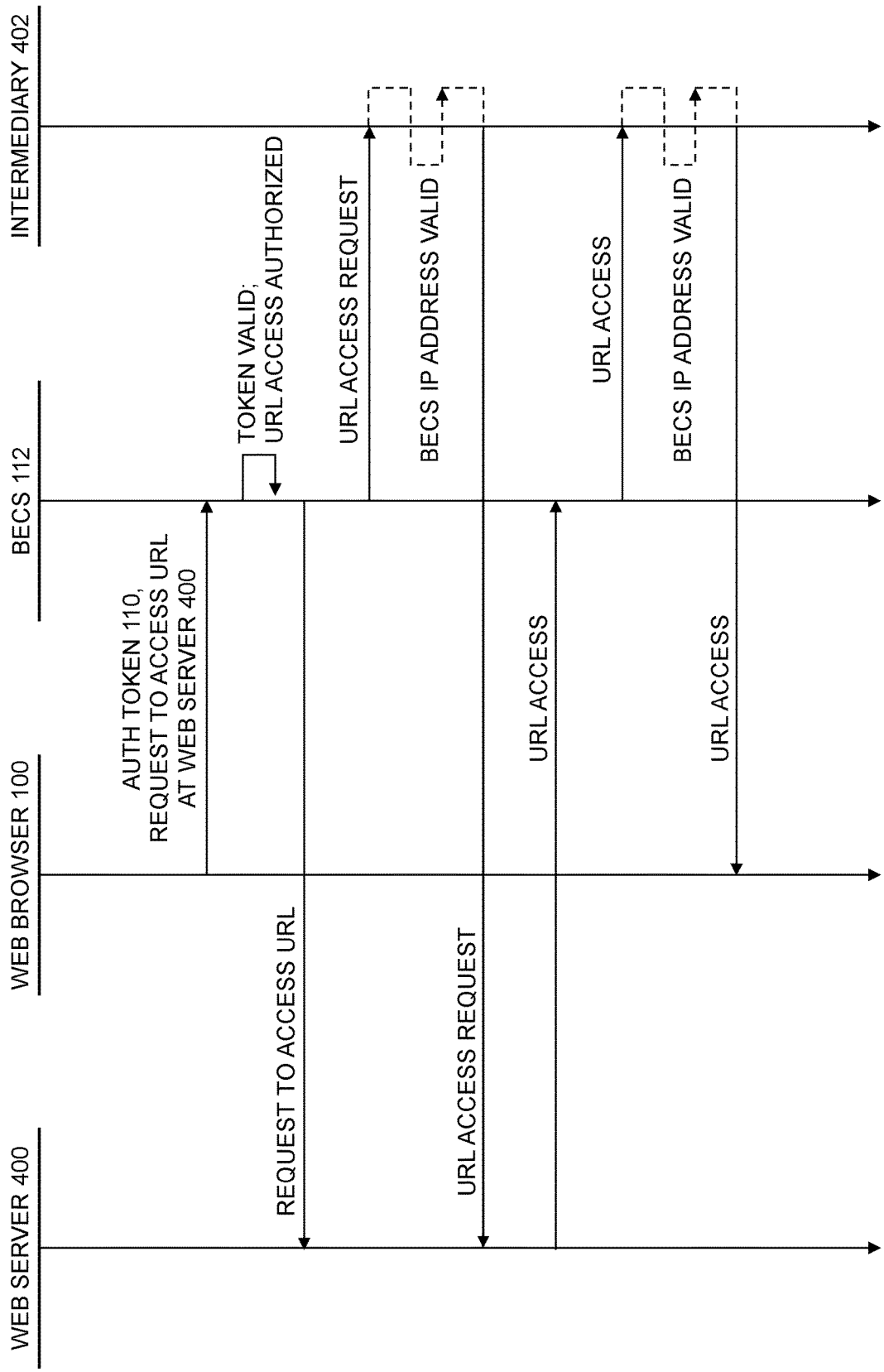
FIG. 4 is a simplified action diagram of an exemplary method of web browser control for use with the system of FIG. 1, operative in accordance with an embodiment of the invention.

Reference is now made to FIG. 4, which is a simplified action diagram of an exemplary method of web browser control for use with the system of FIG. 1, operative in accordance with an embodiment of the invention. In FIG. 4, a user of web browser 100 instructs web browser 100 to access a resource at a user-specified URL at a web server 400. Web browser 100 is configured, such as in accordance with a predefined policy, to require web browser 100 to request the user-specified URL from BECS 112. Web browser 100 sends to BECS 112 authentication token 110 together with the request by web browser 100 to access the user-specified URL, such as in accordance with a predefined policy with which web browser 100 is configured and that applies to the user-specified URL. BECS 112 validates authentication token 110 in accordance with conventional techniques. If authentication token 110 is valid, BECS 112 determines whether the request to access the user-specified URL is authorized, such as by determining whether the current user of web browser 100 and/or a tenant associated with the user are authorized to access the user-specified URL, such as in accordance with a predefined policy with which BECS 112 is configured. If access to the user-specified URL is authorized, BECS 112 sends to web server 400 the request by web browser 100 to access the user-specified URL, where the request must first pass through an intermediary 402, such as a firewall, load balancer, or reverse proxy, en route to web server 400. Intermediary 402, having been previously configured with one or more predefined valid IP addresses that are associated with BECS 112, is configured to block attempts to access the user-specified URL that are received from IP addresses that are not among the predefined valid BECS IP addresses. If intermediary 402 determines that the request to access the user-specified URL was received from a valid BECS IP address, intermediary 402 sends the request to web server 400. BECS 112 then sends to web browser 100 any response it receives from web server 400. Thereafter, BECS 112 continues to proxy communications between web browser 100 and web server 400 via intermediary 402.

SAML IdP Control

Figure 5:
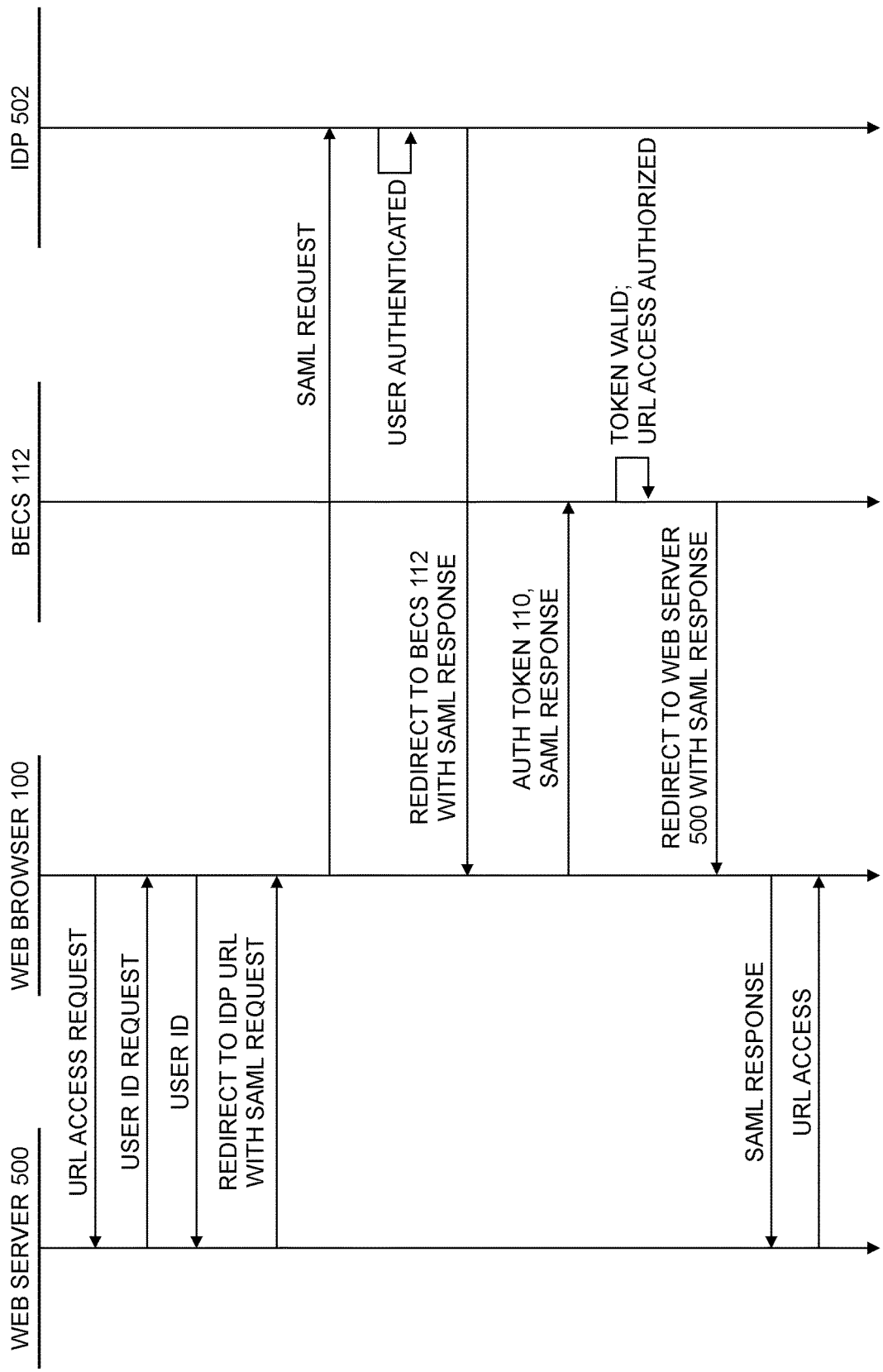
FIG. 5 is a simplified action diagram of an exemplary method of web browser control for use with the system of FIG. 1, operative in accordance with an embodiment of the invention.

Reference is now made to FIG. 5, which is a simplified action diagram of an exemplary method of web browser control for use with the system of FIG. 1, operative in accordance with an embodiment of the invention. In FIG. 5, a user of web browser 100 instructs web browser 100 to access a resource at a user-specified URL. Web browser 100 is configured, such as in accordance with a predefined policy, to allow web browser 100 to request the user-specified URL from web server 500. Web server 500 receives the request from web browser 100 and requests identification from the user, such as an email address or login and password, with which web server 500 is previously configured to associate with a predefined IdP URL at an IdP 502, such as a predefined IdP URL that is uniquely associated with a specific IdP application. Web server 500 redirects web browser 100, together with a Security Assertion Markup Language (SAML) request, to the IdP URL at IdP 502. IdP 502 authenticates the user in accordance with conventional techniques, and determines, having been previously configured to do so, that the user is to be provided with the SAML response and redirected to BECS 112. Web browser 100 sends to BECS 112 authentication token 110 together with the SAML response. BECS 112 validates authentication token 110 in accordance with conventional techniques. If authentication token 110 is valid, BECS 112 validates the SAML response and determines whether access to the resource specified in the SAML response is authorized, such as by determining whether the current user of web browser 100 and/or a tenant associated with the user are authorized to access the resource specified in the SAML response, such as in accordance with a predefined policy with which BECS 112 is configured. If access to the resource is authorized, BECS 112 signs the SAML response using a SAML certificate with which web server 500 has been previously configured, and redirects web browser 100, together with the signed SAML response, to web server 500 which validates the SAML response using the aforementioned SAML certificate and, if the SAML response is valid, allows the user access to the resource.

Inline Network Enforcement

Figure 6:
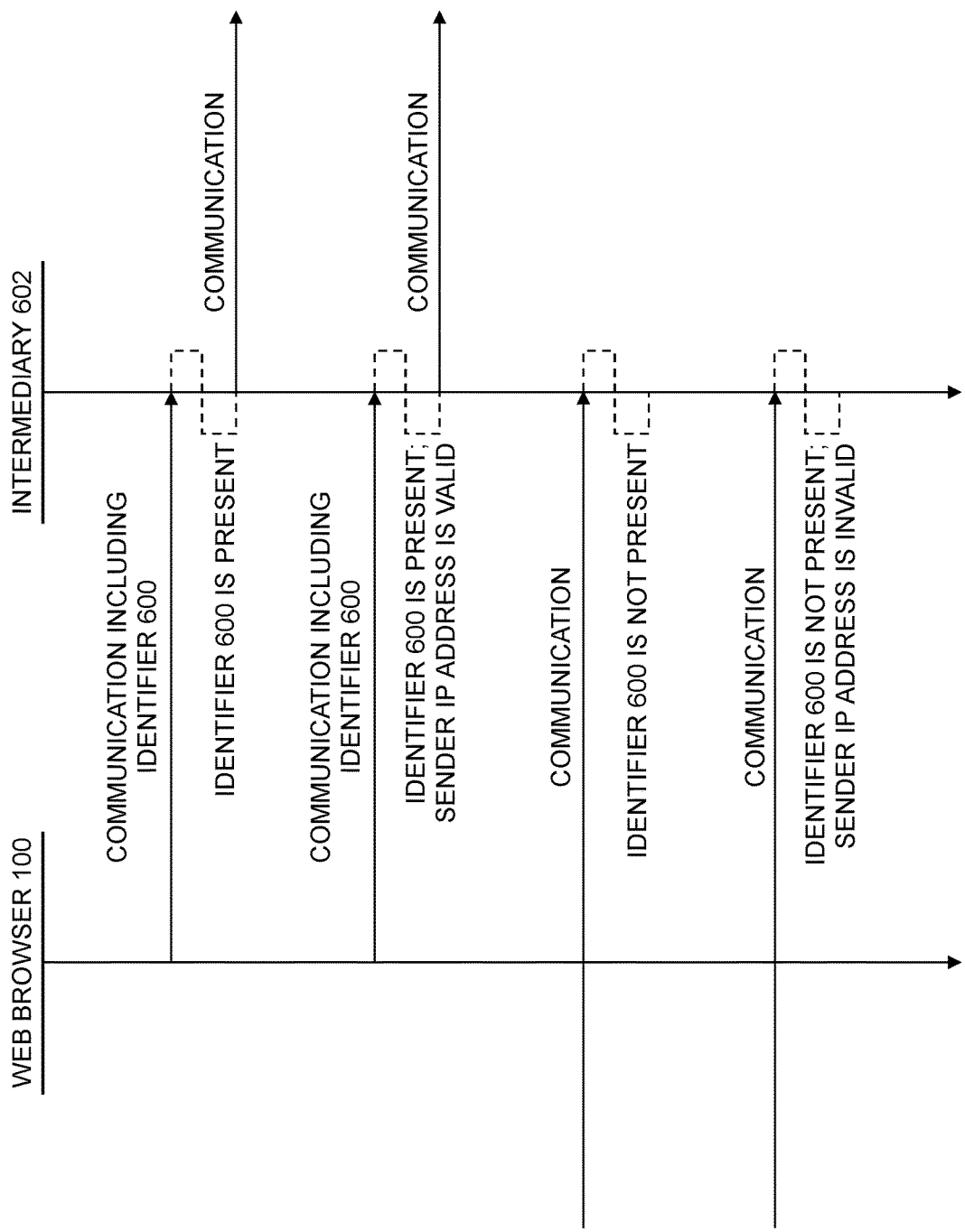
FIG. 6 is a simplified action diagram of an exemplary method of web browser control for use with the system of FIG. 1, operative in accordance with an embodiment of the invention.

Reference is now made to FIG. 6, which is a simplified action diagram of an exemplary method of web browser control for use with the system of FIG. 1, operative in accordance with an embodiment of the invention. In FIG. 6, web browser 100 is configured with an identifier 600, such as a predefined digital token, header, or certificate. Web browser 100 is further configured to include identifier 600 in outgoing communications, such as in all outgoing communications, or only in communications to predefined destinations with which web browser is configured, such as by BECS 112. Web browser 100 may be further configured to sign and/or encrypt identifier 600 in accordance with conventional techniques before including identifier 600 in an outgoing communication. Intermediary 602 is configured to check communications to determine whether identifier 600 is present within a received communication. In one embodiment intermediary 602 is configured to perform this check on communications that it receives from a predefined origin, such any IP addresses within a corporate intranet, which includes the IP address of a computing device 604 that hosts web browser 100. Intermediary 602 may be further configured to decrypt and/or otherwise validate identifier 600 in accordance with conventional techniques when identifier 600 is present within a received communication. Intermediary 602 is further configured to allow such communications in which identifier 600 is present to proceed to a destination that is indicated within the communication, such as to an application 606 via the Internet, and to prevent such communications in which identifier 600 is not present from proceeding to their indicated destination.

Managed Devices—Proxy Setting

Figure 7:
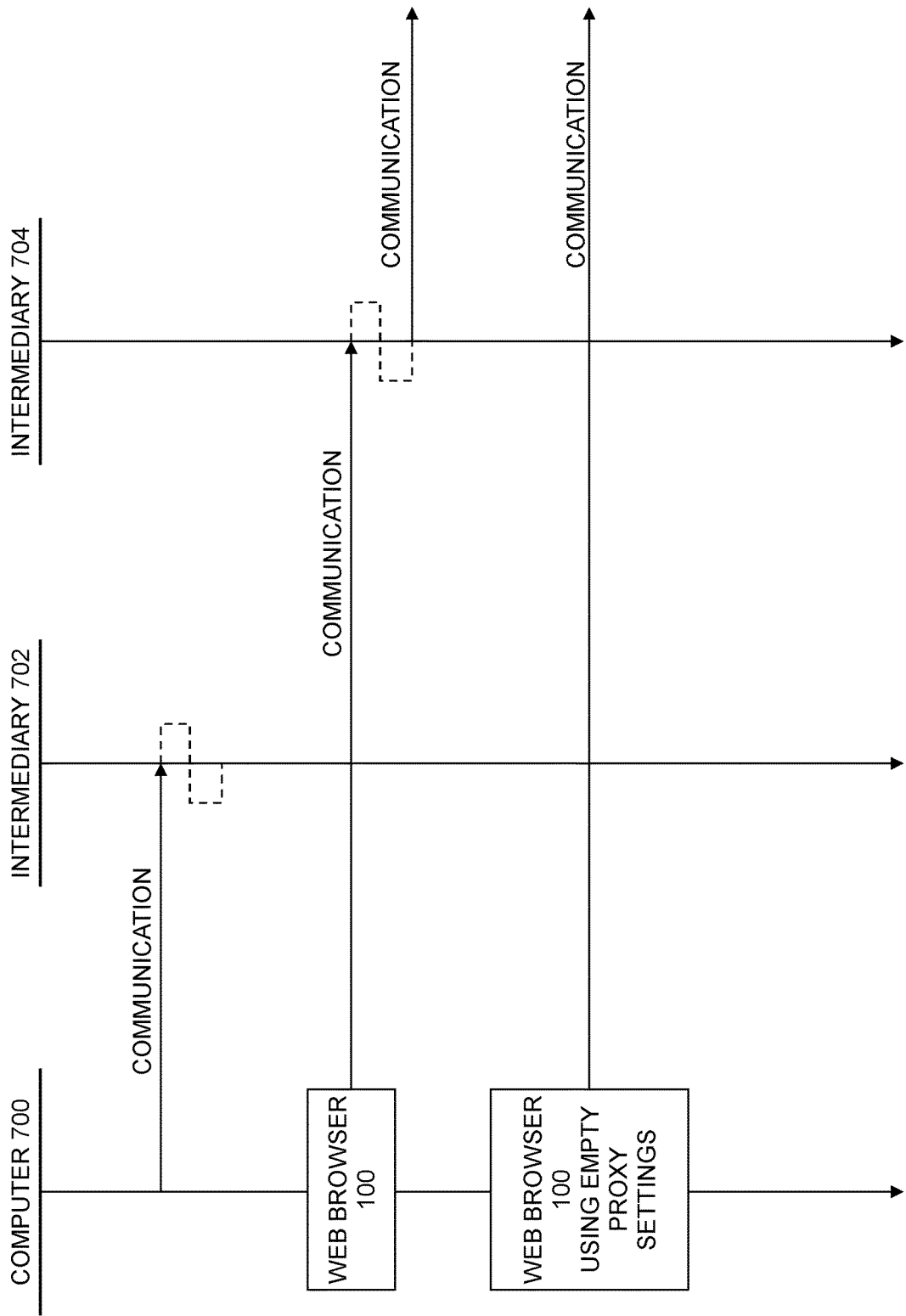
FIG. 7 is a simplified action diagram of an exemplary method of web browser control for use with the system of FIG. 1, operative in accordance with an embodiment of the invention.

Reference is now made to FIG. 7, which is a simplified action diagram of an exemplary method of web browser control for use with the system of FIG. 1, operative in accordance with an embodiment of the invention. In FIG. 7, web browser 100 is installed on a computer 700 that is configured to route all its outgoing communications to an intermediary 702, such as a proxy server, whereas web browser 100 is configured to override this and instead route its outgoing communications to an intermediary 704, such as a different proxy server. Intermediary 702 is configured to prevent some (e.g., associated with specific destinations) or all outgoing communications that intermediary 702 receives from proceeding to their destinations that are indicated within the communications, whereas intermediary 704 is configured to allow all outgoing communications that it receives to proceed to their destinations. In this embodiment, computer 700 and intermediaries 702 and 704 are "managed devices" whose settings are protected in accordance with conventional access-control techniques such that they are configurable only by authorized personnel. In another embodiment, web browser 100 overrides the proxy settings of computer 700 with empty proxy settings for all outgoing communications from web browser 100, which enables all such communications from web browser 100 to proceed to their destinations without being routed through intermediary 704.

Managed Devices—DNS

Figure 8:
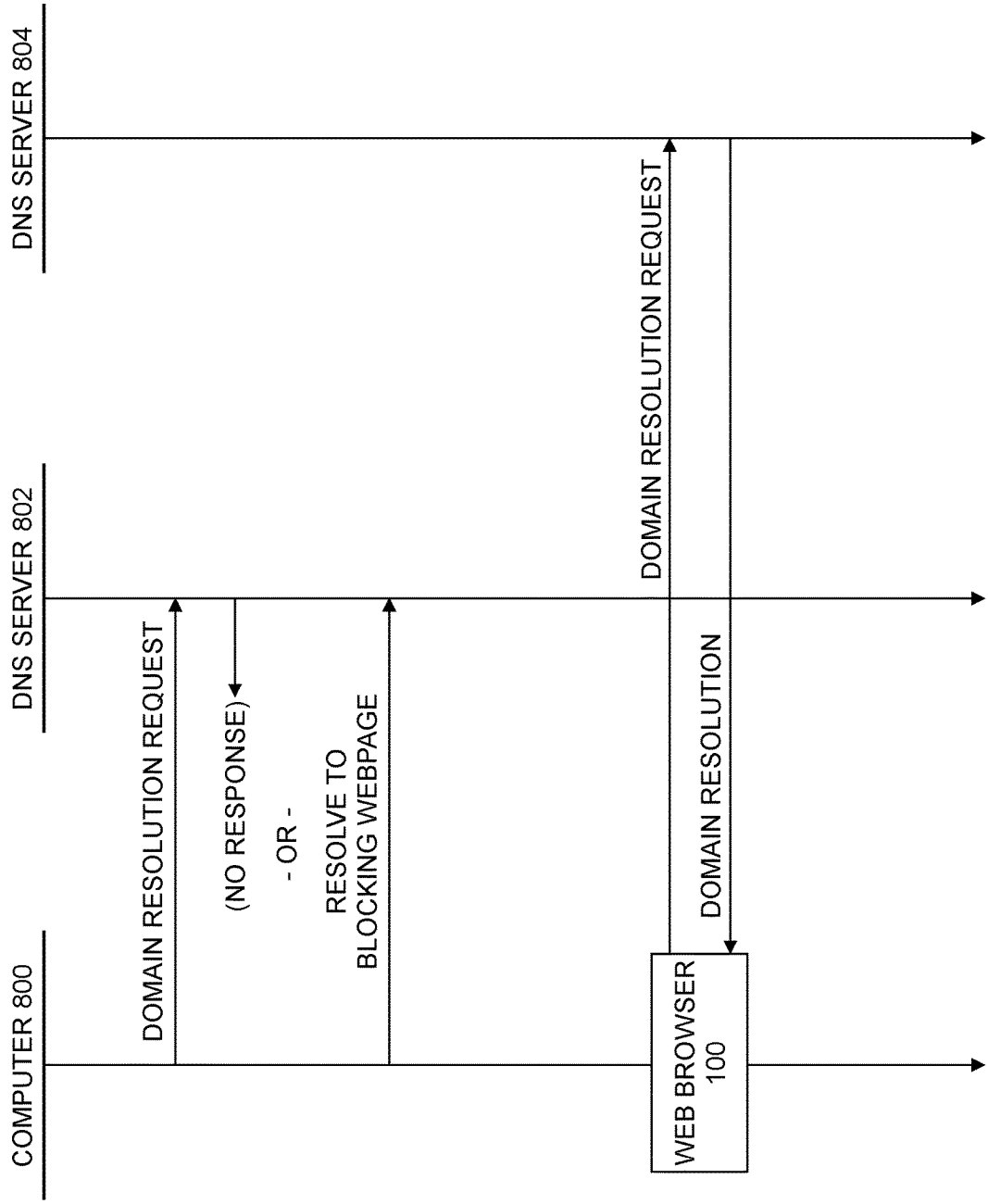
FIG. 8 is a simplified action diagram of an exemplary method of web browser control for use with the system of FIG. 1, operative in accordance with an embodiment of the invention.

Reference is now made to FIG. 8, which is a simplified action diagram of an exemplary method of web browser control for use with the system of FIG. 1, operative in accordance with an embodiment of the invention. In FIG. 8, web browser 100 in installed on a computer 800 that is configured to use a Domain Name System (DNS) server 802 to resolve the domains of all URLs to which access is requested by software or hardware installed on computer 800. Web browser 100 is configured to override this and instead use a DNS server 804 to resolve the domains of all URLs to which access is requested by web browser 100. DNS server 802 is configured to is configured to not correctly resolve some (e.g., associated with specific domains) or all domain resolution requests that DNS server 802 receives, either at all or by resolving any or all the domain requests to a predefined blocking web page at a domain that is not associated with the domains of the requested URLs. DNS server 804 is configured to correctly resolve, in accordance with conventional techniques, all domain resolution requests that DNS server 804 receives. In this embodiment, computer 800 and DNS servers 802 and 804 are "managed devices" whose settings are protected in accordance with conventional access-control techniques such that they are configurable only by authorized personnel. DNS server 804 is optionally configured as a secure DNS server that requires that access to DNS server 804 be authenticated, such as with an authentication token, where web browser 100 is configured with the authentication token required to access DNS server 804.

Any aspect of the invention described herein may be implemented in computer hardware and/or computer software embodied in a non-transitory, computer-readable medium in accordance with conventional techniques, the computer hardware including one or more computer processors, computer memories, I/O devices, and network interfaces that interoperate in accordance with conventional techniques.

It is to be appreciated that the term "processor" or "device" as used herein is intended to include any processing device, such as, for example, one that includes a CPU (central processing unit) and/or other processing circuitry. It is also to be understood that the term "processor" or "device" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart illustrations and block diagrams in the drawing figures illustrate the architecture, functionality, and operation of possible implementations of systems, methods, and computer program products according to various embodiments of the invention. In this regard, each block in the flowchart illustrations or block diagrams may represent a module, segment, or portion of computer instructions, which comprises one or more executable computer instructions for implementing the specified logical function(s). In some alternative implementations, the functions noted in a block may occur out of the order noted in the drawing figures. For example, two blocks shown in succession may, in fact, be executed substantially concurrently, or the blocks may sometimes be executed in the reverse order, depending upon the functionality involved. It will also be noted that each block of the flowchart illustrations and block diagrams, and combinations of such blocks, can be implemented by special-purpose hardware-based and/or software-based systems that perform the specified functions or acts.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments.

What is claimed is:

1. A method of web browser control, the method comprising:
    configuring a web browser to send a predefined identifier in a communication sent by the web browser, wherein a destination of the communication is indicated within the communication; and
    configuring an intermediary to
        receive the communication,
        determine whether the identifier is present within the received communication,
        allow the received communication to proceed to the destination of the communication responsive to the identifier being present within the received communication, and
        prevent the received communication from proceeding to the destination of the communication responsive to the identifier being not present within the received communication,
    wherein the intermediary is configured to determine whether the identifier is present within the communication received from a predefined origin.

2. The method according to claim 1 wherein the identifier is a digital token, header, or certificate.

3. The method according to claim 1 wherein the web browser is configured to include the identifier in all communications sent by the web browser.

4. The method according to claim 1 wherein the web browser is configured to include the identifier in communications sent by the web browser to one or more predefined destinations.

5. The method according to claim 1 wherein the predefined origin includes one or more predefined network addresses.

6. The method according to claim 1 wherein the predefined origin includes the network address of a computing device that hosts the web browser.

* * * * *